Patented July 25, 1933

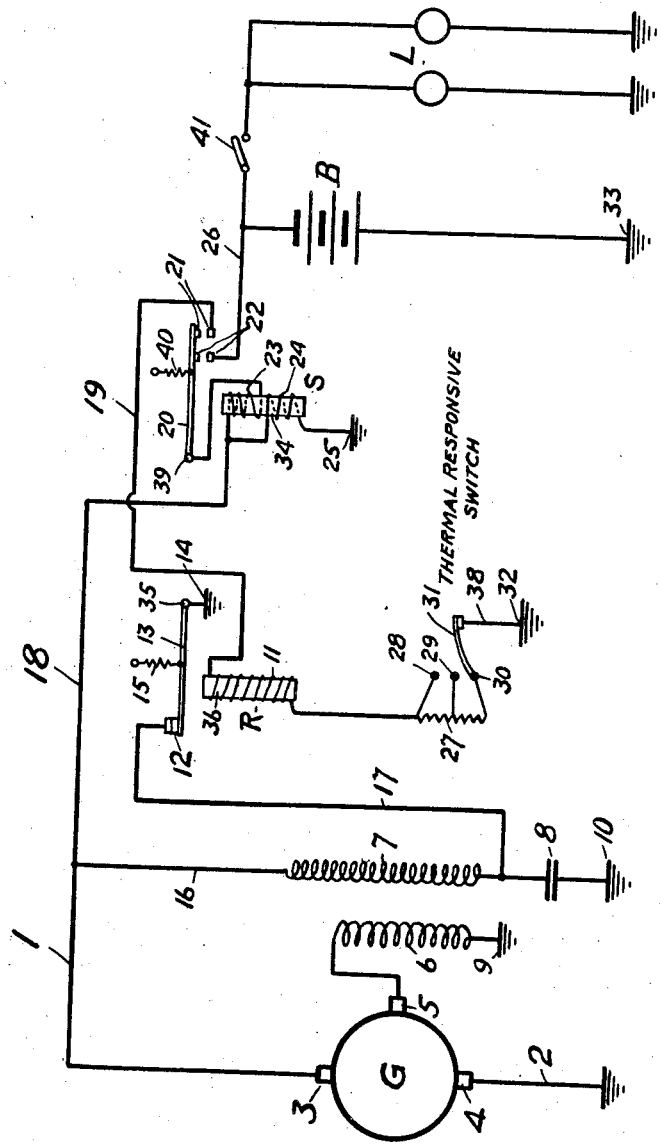

1,919,892

UNITED STATES PATENT OFFICE

WILLIAM C. LEINGANG OF DETROIT, MICHIGAN

MEANS FOR CONTROL OF THE CHARGE OF A STORAGE BATTERY

Application filed October 3, 1932. Serial No. 635,890.

The object of this invention is to provide means for charging a storage battery selectively at either a high or a low rate and to control said means in response to the voltage of the battery, including means for adjusting the value of the battery voltage at which said control is effected in response to temperature. More specifically the invention includes a generator of the third brush type provided with the usual field coil connected to the third brush of the machine and a second field coil connected across the main terminals of the machine, the means for controlling the charge of the battery being applied to the auxiliary field coil.

For a further exposition of my invention reference may be had to the annexed drawing and specification at the end of which the invention will be specifically pointed out and claimed.

The single figure of the annexed drawing is a diagrammatic view of the invention.

In the accompanying drawing G is a generator of the third brush type which may be driven by the engine of an automobile at variable speed. The main brushes of the generator G are shown at 3 and 4, brush 4 being connected to ground at 2 and brush 3 to the conductor 1. The third brush of the generator is shown at 5 to which the field winding 6 is connected at one terminal, the other being connected to ground at 9. The auxiliary field of the generator is shown at 7, connected at one terminal by conductor 16 to conductor 1. The other terminal of field winding 7 is connected through blocking condenser 8 to ground at 10. No current will therefore flow through coil 7 unless a by-pass is established around blocking condenser 8. This by-pass is established by a voltage relay R whose contacts are shown at 12, the by-pass being established through conductor 17, contacts 12 and armature 13 to ground at 14. The relay R is controlled by an electromagnet whose core is shown at 36, excited by coil 11, arranged for connection across the battery B by means of conductor 19 and the contacts 21 and 22 of the automatic switch S and conductor 26. The opposite end of battery B is connected to ground at 33 and the opposite end of coil 11 is connected to ground at 32 through the thermal responsive rheostat T. The generator G is connected to battery B by means of the automatic switch S which is of the usual type, provided with a shunt coil 24 and a series coil 23, the connection from the generator to the battery being completed when contacts 22 are closed. At L are shown load devices such as lamps, which may be connected to the battery B by means of the switch 41.

The operation of the apparatus is as follows:

When the generator G is operating below the normal generating speed, its voltage will be too low for closing the automatic switch S and the battery will be carrying the entire load. When the speed of the generator increases to a point where a predetermined voltage is developed by reason of the excitation of field 6, the automatic switch S will close the contacts 21 and 22, thus connecting the generator to the battery and connecting coil 11 of relay R across the battery through the circuit described above. When the battery is only partially charged, its voltage while charging from the generator G will not be sufficiently high to cause coil 11 of the relay R to attract its armature 13, so that under these conditions the contacts 12 will be closed and the auxiliary field coil 7 will be connected in circuit across the main terminals of the generator as described above. This will give maximum excitation to the generator and a maximum charging current to the battery.

When as the charge progresses the battery voltage increases to a predetermined value, the excitation of the coil 11 will be sufficient to attract the armature 13 and to open the contacts 12, thereby interrupting the current through field coil 7. The condenser is useful for suppressing the spark at the contacts 12 when the circuit is opened at this point.

When the circuit of field coil 7 is thus opened, the excitation of the generator is reduced and the charging current is therefore reduced to a lower value suitable for charging the battery when it approaches the fully charged condition.

The voltage at which the charging rate should be reduced from the higher to the lower value will be higher in winter than in summer. The thermally controlled rheostat T provides for this. This rheostat comprises a resistor 27 connected at various points to contacts 28, 29 and 30. A contact arm 31 consisting of a bimetallic strip responsive to changes of temperature is arranged to make contact with any one of the several contact points 28, 29 and 30 and is so arranged that at the lower temperatures a greater amount of the resistor 27 will be in circuit, requiring a higher voltage to operate the relay R.

I do not intend to be limited in the practice of my invention save as the scope of the prior art and of the attached claims may require.

I claim:

1. In combination, a generator of the third brush type provided with a normal field winding connected to the third brush and an auxiliary field winding adapted for connection across the main brushes, a storage battery connected across the main brushes of the generator, a voltage responsive relay connected across the battery and adapted to open the circuit of the auxiliary field winding at a predetermined battery voltage, and a thermal responsive means adapted to control the value of the voltage at which the relay operates.

2. A combination including a generator having main brushes and a third brush and a normal field coil and an auxiliary field coil, a storage battery adapted to be connected across the main brushes of the generator, a coil adapted to be connected across said battery, means responsive to said last mentioned coil for connecting and disconnecting said auxiliary field coil across said main brushes, thermal responsive means in series with said last mentioned coil across said battery to vary the voltage at which said last mentioned coil operates said last mentioned means, and a condenser in series with said auxiliary field coil across said battery and in parallel with said means for connecting and disconnecting said auxiliary field coil across said main brushes to reduce sparking of said means.

WILLIAM C. LEINGANG.